United States Patent
Kurth et al.

(10) Patent No.: US 10,493,495 B2
(45) Date of Patent: Dec. 3, 2019

(54) SORTING OF ALUMINIUM ALLOYS ON THE BASIS OF ELECTRICAL CONDUCTIVITY VALUES

(71) Applicant: Hydro Aluminium Recycling Deutschland GmbH, Dormagen (DE)

(72) Inventors: Boris Kurth, Kaarst (DE); Gregor Kurth, Neuss (DE)

(73) Assignee: Hydro Aluminium Recycling Deutschland GmbH, Dormagen (DE)

( * ) Notice: Subject to any disclaimer, the term of this patent is extended or adjusted under 35 U.S.C. 154(b) by 0 days.

(21) Appl. No.: 15/752,050

(22) PCT Filed: Aug. 17, 2016

(86) PCT No.: PCT/EP2016/069474
§ 371 (c)(1),
(2) Date: Feb. 12, 2018

(87) PCT Pub. No.: WO2017/029306
PCT Pub. Date: Feb. 23, 2017

(65) Prior Publication Data
US 2018/0229274 A1 Aug. 16, 2018

(30) Foreign Application Priority Data

Aug. 17, 2015 (DE) .................. 10 2015 113 570

(51) Int. Cl.
*B07C 5/344* (2006.01)
*C22B 7/00* (2006.01)
(Continued)

(52) U.S. Cl.
CPC .............. *B07C 5/344* (2013.01); *B07C 5/361* (2013.01); *C22B 7/001* (2013.01); *C22B 7/005* (2013.01);
(Continued)

(58) Field of Classification Search
CPC ..... B07C 5/34; B07C 5/344; C22B 7/001; C22B 7/005
(Continued)

(56) References Cited

U.S. PATENT DOCUMENTS 3,944,076 A * 3/1976 Goulds .................. B07C 5/344
209/571
5,133,505 A 7/1992 Bourcier et al.
(Continued)

FOREIGN PATENT DOCUMENTS

EP 0541403 A2 5/1993
ES 2342350 A1 7/2010
WO WO-2009152290 A1 * 12/2009 ............. B07C 5/368

OTHER PUBLICATIONS

Mutz, Stephan et al.: "Sorting of Aluminium and Its Alloys Within the European Automobile Recycling", Jan. 1, 2005 (Jan. 1, 2005), pp. 3-6, XP055312932, retrieved from the Internet<URL:http://library.tee.gr/digital/m2045/m2045_mutz.pdf>. [retrieved on Oct. 21, 2016].
(Continued)

*Primary Examiner* — Terrell H Matthews
(74) *Attorney, Agent, or Firm* — Harness, Dickey & Pierce, P.L.C.

(57) ABSTRACT

In order to provide a method and device that allow sorting of light-alloy aluminium scrap, the disclosure proposes a method for sorting aluminium scrap and alloys thereof wherein the aluminium scrap is fed to a measuring station, where the electrical conductivity of each aluminium part is measured, and, depending on the result of the measurement, the part is transported further on a dedicated path.

7 Claims, 1 Drawing Sheet

(51) Int. Cl.
*B07C 5/36* (2006.01)
*C22B 21/00* (2006.01)

(52) U.S. Cl.
CPC ............ *C22B 21/0069* (2013.01); *B07C 5/36* (2013.01); *B07C 2501/0036* (2013.01); *B07C 2501/0054* (2013.01); *C22B 21/0007* (2013.01); *Y02P 10/214* (2015.11)

(58) Field of Classification Search
USPC .................................................. 209/571, 573
See application file for complete search history.

(56) References Cited

U.S. PATENT DOCUMENTS

| | | | |
|---|---|---|---|
| 5,209,355 A * | 5/1993 | Mindermann | B07C 5/344 209/11 |
| 7,786,401 B2 * | 8/2010 | Valerio | B07C 5/368 209/571 |
| 2017/0003237 A1 * | 1/2017 | Pechstein | G01N 27/023 |
| 2017/0014868 A1 * | 1/2017 | Garcia, Jr. | B07C 5/3416 |

OTHER PUBLICATIONS

Database WPI, Week 201077, Thomson Scientific, London, GB; AN 2010-J28961, XP002763252.

\* cited by examiner

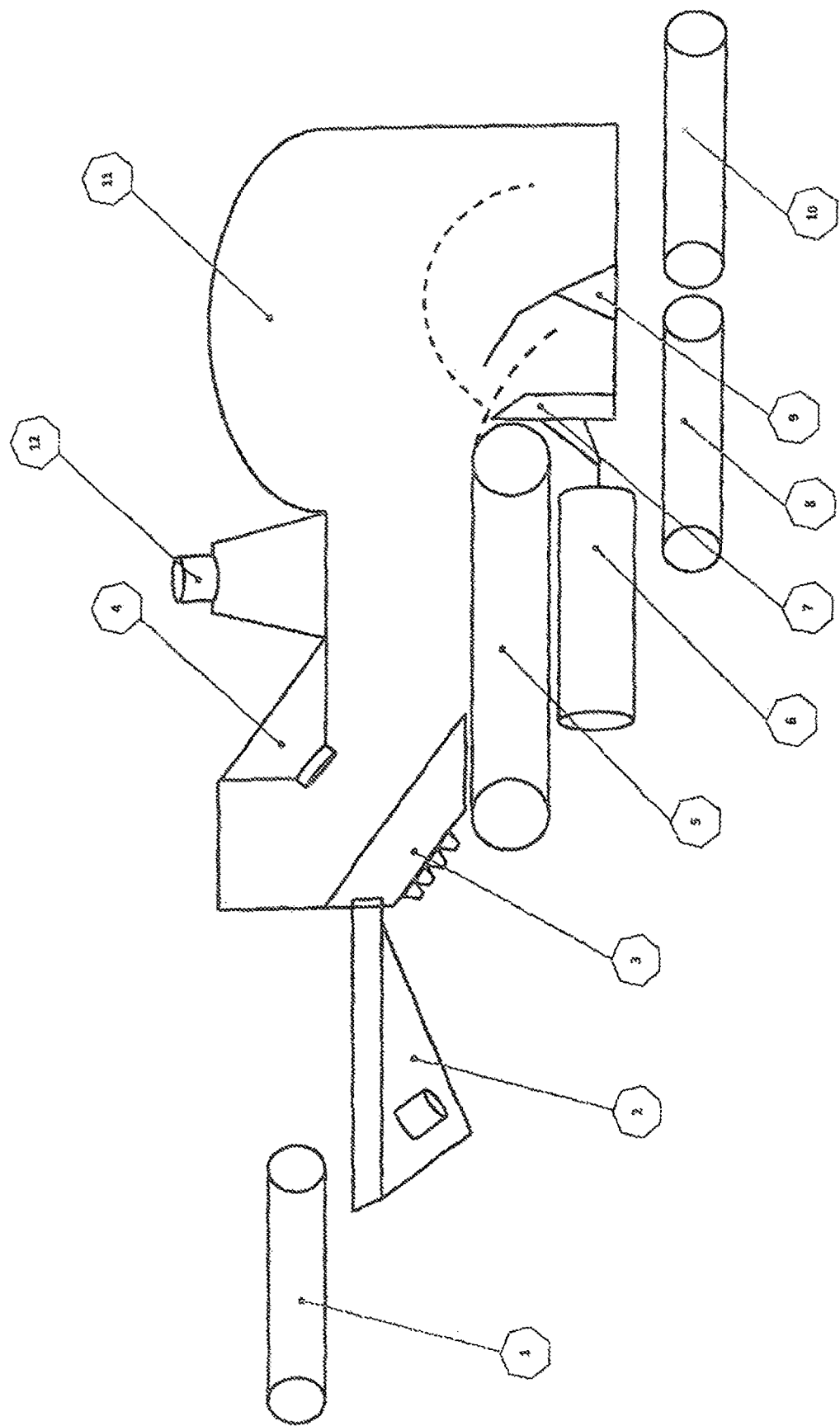

SORTING OF ALUMINIUM ALLOYS ON THE BASIS OF ELECTRICAL CONDUCTIVITY VALUES

CROSS-REFERENCE TO RELATED APPLICATIONS

This application is a National Stage of International Application No. PCT/EP2016/069474, filed on Aug. 17, 2016, and published in German as WO2017/029306 A1 on Feb. 23, 2017. This application claims the priority to German Patent Application No. 10 2015 113 570.1, filed on Aug. 17, 2015. The entire disclosures of the above applications are incorporated herein by reference.

FIELD

The present disclosure relates to a method and a device for sorting various alloys in aluminium scrap.

BACKGROUND

This section provides background information related to the present disclosure which is not necessarily prior art.

Aluminium scrap is usually crushed. Impurities can then be sorted out or separations or sorting of non-metallic or foreign-metal elements can be performed. Generally, it is also possible to sort aluminium scrap if the scrap materials can be distinguished from one another by their metallic composition and/or their measurable large difference in density. For example, alloys with an elevated zinc, copper, iron or lead content can be easily identified. If the differences in density are small, sorting will be inaccurate.

In the domain of industrial recycling of aluminum scrap, considerable bulk streams occur, which may be in a range of several tons per hour. It is not possible at present to sort aluminum scrap in any way wanted. For example, alloy mixtures of alloys in groups 5000 and 6000 cannot be separated from one another.

SUMMARY

This section provides a general summary of the disclosure, and is not a comprehensive disclosure of its full scope or all of its features.

Based on the above-described prior art, it is an object of the present disclosure to provide a method and a device that allow sorting of aluminium alloys. This object is technically achieved by a method comprising the features of claim 1. Further features and advantages are described in the subclaims.

A device is also proposed.

According to the disclosure, it is provided to distinguish aluminium scraps and alloys thereof by their electric conductivity. It has been found that different aluminium alloys also have different electric conductivities.

The electric conductivity, which is also referred to as convectivity, relates to the ability of a material to conduct electric current. The conductivity is expressed in Siemens per meter—S/m. There is an international standard, which relates to a copper pattern, IACS (International Association of Classification Societies). Electric conductivity is usually measured by eddy current technique.

The disclosure makes use of the fact that different aluminium alloys have different electric conductivities. In this manner, it is possible to distinguish aluminum scraps from one another.

According to the disclosure, the aluminium scraps are crushed. A particle size of >10 mm to 80 mm turned out to be sortable rather well, these sizes being rough diameter values or edge lengths. The aluminum scrap is available in the form of platelets of an appropriate size.

According to the disclosure, the scrap or the parts can be isolated. Thereafter, they are contacted with a sensor for measuring the electric conductivity. The measured value is supplied to a control unit. Additionally, the position of the aluminium part in relation to the entire conveying unit is identified using a high-speed camera for instance. Thereafter, the sorting decision is made and the implementation takes place. This can be effected for instance by the undesired alloy being shot out pneumatically, discharged or otherwise removed.

According to an advantageous proposal of the disclosure, the measuring station is included in a conveying path, for example in the form of a strip-like sensor array, such that the parts to be measured can be passed over the sensor array and can make contact with the sensor.

According to the disclosure, it is possible to process huge bulk streams at an industrial scale.

On the side of the device, the latter comprises a conveying path, measuring contacts and a separating station, wherein the measuring contacts are comprised of at least one sensor for measuring the electric conductivity. Additionally, a control unit is provided that interprets the measurement result and also makes the decision on further transportation and implements the decision by controlling corresponding elements. Pneumatic nozzles, diverters, openings and the like can be used for example in order to keep parts on or remove parts from a path.

The disclosure provides for an easy implementable and highly reliable system for sorting aluminium scraps, wherein the system can be used at affordable costs also for huge bulk streams and additionally sorts also alloys which are inseparable in prior art.

Further advantages and features of the disclosure will become apparent from the following detailed description with reference to the attached single drawing FIGURE showing a purely schematic illustration of carrying out a method in accordance with the disclosure using a device in accordance with the disclosure.

The description and specific examples in this summary are intended for purposes of illustration only and are not intended to limit the scope of the present disclosure.

DETAILED DESCRIPTION

Example embodiments will now be described more fully with reference to the accompanying drawing.

The device of the disclosure for sorting aluminum scraps comprises a sorting chamber 11. Aluminum scrap is supplied to the inlet side of the sorting chamber via a material feeding device 1, which is configured as a conveyor belt in the embodiment shown. On the inlet side, the sorting chamber 11 provides a measuring station 3 including measuring contacts configured for measuring the electrical conductivity. Thus the measuring station 3 can also be referred to as a sensor unit.

In the illustrated example, a homogenizing unit 2 is arranged between the material feeding device 1 and the measuring station 3. This homogenizing unit 2 may for example be a vibrating chute. The purpose of this homogenizing unit 2 is to isolate and homogenize material supplied to the sorting chamber 11 via the material feeding device 1, such that an optimized measurement of the electrical conductivity by means of the measuring station 3 can be performed. In this context, it is particularly desired for the aluminum scrap parts to be measured for their electrical conductivity not being supplied to the measuring station 3 in a manner superposed upon each other. This is achieved by means of the homogenizing unit 2.

The device according to the disclosure additionally comprises a position detection unit 4. This comprises for example one or more high-speed cameras and/or an X-ray detection system. The purpose of the position detection unit 4 is to determine the respective position of the aluminium scrap parts of which the electrical conductivity has been detected.

The measuring station 3 is followed by a conveyor belt 5, to which the scrap parts that have been detected by measurement are supplied. Optionally, an additional position detection unit 12 can be provided, which cooperates with the conveyor belt 5 such that an alternative or supplementary position determination of the aluminum scrap parts can be made.

In the continued transportation path of the aluminium scrap parts, the conveyor belt 5 is followed by a nozzle module 7, which cooperates with a compressed air reservoir 6. This nozzle module 7 comprises a plurality of compressed air nozzles, which are preferably adjustable in the direction of discharge of compressed air and can thus be displaced as needed.

The nozzle module 7 serves for subjecting individual aluminium scrap parts leaving the conveyor belt 5 to a pressurized air stream in a targeted manner such that a separation of the aluminum scrap can take place through the nozzle module 7 in order to allow impurities to be sorted out. The sorting out of impurities in a targeted manner is effected via the nozzle module 7 by directing a well-targeted burst of compressed air to parts to be sorted out, which is possible because of the knowledge of the electrical conductivity or the position previously detected. In the illustration of FIG. 1, the broken line extending up to the conveyor belt 10 describes the trajectory parabola for the impurities, whereas the broken line pointing to the conveyor belt 8 describes the trajectory parabola for the valuable material desired to be sorted out. These two trajectory parabolas are spatially separated from each other by a separation vertex 9, which serves the separation of the two qualities that have been separated from one another. The qualities thus separated are then transported away by means of the conveyor belts 9 or 10.

The measurement of the electrical conductivity of the individual aluminium scrap parts by means of the measuring station 3 allows individual aluminium alloys to be distinguished from one another. It is possible in particular to distinguish aluminium alloy in the 5000 group from aluminium alloy in the 6000 group. But it is also possible to make distinctions within one alloy group if needed such that a separation can be made within alloy group 5000 and also within alloy group 6000. Of course, it also possible to distinguish other aluminium alloy groups from one another.

Prepared aluminium scrap is supplied to the sorting chamber 11 by means of the material feeding device 1. Preferably, this prepared aluminium scrap has been mechanically treated in a pre-process. It can be provided in particular that the aluminium scrap used as a starting material is first crushed and that the crushed aluminium scrap is then supplied to a screening unit. By means of such a screening unit, the crushed aluminium scrap is divided into a fraction of undersized particle materials on the one hand and a fraction of oversized particle materials on the other hand. The fraction of oversized particle materials represents the mechanically treated aluminium scrap, which is then supplied to the sorting chamber 11 by means of the material feeding device 1. The purpose of the aluminium scrap treatment is to obtain aluminium parts such that the electrical conductivity of individual aluminium scrap parts can be detected in a reliable manner by the measuring station 3 also in the bulk stream. The aim is to ensure that the aluminium scrap parts supplied to the measuring station 3 have a particle size of 10 mm to 80 mm.

The electrical conductivities measured by the measuring station 3 of the individual aluminium scrap parts fed to the measuring station 3 allow a differentiation by alloys that are present. In particular, it is possible to distinguish aluminium scrap in the group 5000 of aluminium scraps from those in the group 6000. The measurement value obtained by the measuring station 3 for each aluminium scrap part is supplied to a control unit not further illustrated in the drawing FIGURE. At the same time, the precise position of each aluminium scrap part is detected by means of the position detection unit 4, and this position information is also supplied to the control unit. Accordingly, the electrical conductivity detected in each case on the one hand and on the other hand the precise position are known for each aluminium scrap part. This allows in the further course of the procedure that individual aluminium scrap parts are engaged by air via the nozzle module 7 and are discharged in a targeted manner. In the illustrated embodiment, a separation into two fractions is made. Of course, it is also possible to make a further differentiation and optionally generate three, four or five or even more fractions. Namely, the configuration in accordance with the disclosure allows to reliably locate and sort out parts of a particular composition using as a sorting-out criterion the physical parameter of the electrical conductivity, which is characteristic in particular of the alloy composition of aluminium scrap. This preferably allows for a degree of purity with regard to the sorted-out final products that was previously impossible with the use of the known prior art methods.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for sorting aluminium alloys in aluminium scrap, wherein the aluminium scraps are supplied to a measuring station where a contact between the aluminium scraps and a sensor for measuring the electrical conductivity of the aluminium scraps is made, where the electrical conductivity of the aluminium scraps is measured while in contact with the sensor and the aluminium scraps are transported further on a dedicated path depending on the result of the measurement.

2. The method according to claim 1, wherein the aluminium scraps are crushed.

3. The method according to claim 2, wherein the aluminium scraps are homogenized.

4. The method according to claim 3, wherein the aluminium scraps of a defined size are removed prior to sorting.

5. The method according to claim 1, wherein the aluminium scraps are separated depending on the result of the measurement.

6. The method according to claim 1, wherein the aluminium scraps are blown off by means of pressurized air depending on the result of the measurement.

7. The method according to claim 1, wherein the contacts for measuring the electrical conductivity are included in the transportation path.

* * * * *